United States Patent
Tekesky

(10) Patent No.: US 9,506,514 B1
(45) Date of Patent: Nov. 29, 2016

(54) WEDGE SPRING CLIP

(71) Applicant: Bendix Spicer Foundation Brake LLC, Elyria, OH (US)

(72) Inventor: Robert S. Tekesky, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 14/849,333

(22) Filed: Sep. 9, 2015

(51) Int. Cl.
*F16D 65/097* (2006.01)
*F16D 55/225* (2006.01)

(52) U.S. Cl.
CPC ......... *F16D 65/0978* (2013.01); *F16D 55/225* (2013.01); *F16D 65/0972* (2013.01)

(58) Field of Classification Search
CPC ............. F16D 65/097; F16D 65/0972; F16D 65/0977; F16D 65/0978; F16D 2055/0008; F16D 2055/0016; F16D 2055/0041; Y10T 29/49826
See application file for complete search history.

(56) References Cited

U.S. PATENT DOCUMENTS

| 5,535,856 | A | * | 7/1996 | McCormick | F16D 55/227 188/205 A |
| 5,941,348 | A | * | 8/1999 | Matsumoto | F16D 65/0972 188/73.36 |
| 6,269,915 | B1 | * | 8/2001 | Aoyagi | F16D 65/0977 188/205 A |
| 6,378,666 | B1 | * | 4/2002 | Yoko | F16D 65/0977 188/73.36 |
| 7,318,503 | B2 | * | 1/2008 | Farooq | F16D 65/0974 188/205 A |
| 7,644,809 | B2 | * | 1/2010 | Cortinovis | F16D 65/0972 188/205 A |
| 9,097,304 | B2 | * | 8/2015 | Plantan | F16D 65/097 |
| 9,206,876 | B2 | * | 12/2015 | Yamashita | F16F 9/3485 |
| 9,261,152 | B2 | * | 2/2016 | Gutelius | F16D 65/0973 |
| 2007/0227839 | A1 | * | 10/2007 | Barrett | F16D 65/0972 188/73.31 |
| 2014/0131148 | A1 | | 5/2014 | Plantan et al. | |

FOREIGN PATENT DOCUMENTS

DE  40 32 886 A1  4/1992
GB  2 017 236 A  10/1979

* cited by examiner

*Primary Examiner* — Vishal Sahni
(74) *Attorney, Agent, or Firm* — Crowell & Moring LLP

(57) ABSTRACT

A system and method are provided for mounting, removing and retaining brake pads in disc brakes, such as air-operated disc brakes utilized on commercial vehicles. A preferred embodiment includes a brake pad carrier having features to fixedly receive spring retaining elements, such as bushings, which in turn retain spring elements, such as spring clips, having features that cooperate with corresponding brake pad surfaces to resist radially-outward motion of the brake pad.

17 Claims, 9 Drawing Sheets

WEDGE SPRING CLIP

BACKGROUND AND SUMMARY OF THE INVENTION

The present invention relates to disc brakes for vehicles, and in particular to a system and method for mounting and retaining brake pads in disc brakes, such as air-operated disc brakes utilized on commercial vehicles.

Pneumatically-operated disc brakes have been undergoing development and deployment on commercial vehicles since at least the 1970's, and are beginning to replace drum-style brakes due to advantages in areas such as cooling, fade resistance and serviceability. German Patent Publication No. DE 40 32 886 A1 discloses an example of such an air disc brake. In this design, a pneumatic diaphragm chamber (pneumatic actuator) is attached to a rear face of the disc brake caliper housing, and applies a brake actuation force through a linear actuator rod to a brake actuator lever within the caliper. The brake's actuator lever in turn transfers and multiplies the force applied by the actuator rod to one or more spindles, which force brake pads against a brake disc or rotor. The terms "brake disc," "rotor" and "brake rotor" are used interchangeably herein.

As shown in FIG. 1 of DE 40 32 886 A1, the actuator is located inboard of the brake caliper, in large part because commercial vehicle wheel rims are sized to only provide adequate clearance for the drum-type brakes historically employed on such vehicles. Because the resulting space envelope between the wheel and its axle is limited, the actuator must be located into the space adjacent to the wheel. For the same reason, brake pads must be configured to conform to the limited available radial space, and thus have typically been located and retained on one of the brake caliper or brake caliper carrier/mount using transverse suspension pins and/or using leaf spring-type metal strips disposed over the outer radius of the brake pads. Brake pads have also been retained by capturing the brake pads between the caliper mounting frame and the portion of the brake caliper which straddles the brake disc. Brake pad support function may be provided by a brake caliper carrier/mount designed to support the brake pads or by a brake pad carrier which is separate from the caliper mounting structure. For convenience in this description, the terms caliper carrier, caliper mount and brake pad carrier may be interchanged without intending to limit the brake par supporting structure to any specific brake pad and brake caliper carrying structure.

Conventional commercial vehicle air disc brakes have typically required the installation of ancillary brake pad retention mechanisms such as a retaining bar arranged transversely across the top of the brake pads. Such arrangements require additional space above the brake pads, which in turn requires taller brake calipers. With the opposing constraint of little available clearance between the inside of the wheel rim and the outer envelope of the brake caliper, it is difficult to accommodate such brake pad retention mechanisms without thinning the caliper and thereby increasing the stress levels in the caliper material and decreasing the caliper's useful service life (e.g., decreased fatigue life).

A further problem with prior art brake pads is the tendency for the brake pad to rotate and/or vibrate during brake operation. When a brake pad is applied against a friction surface of a rotating brake disc, the brake disc's rotation induces motion and reaction forces between the brake pad and its adjacent carrier abutment surfaces. Specifically, at the leading edge of the brake pad, the brake pad attempts to move upward relative to the carrier in response to the friction forces along the face of the brake pad, while at the trailing edge of the brake pad, the brake pad attempts to move downward. However, because the brake pad is constrained by adjacent mount abutment surfaces, the overall motion of the brake pad is generally a rotation about an axis parallel to the brake disc rotation axis. This motion may be unilateral during the brake application, or may manifest itself as a moderate-to-severe oscillation of the brake pad in its mount, significantly increasing wear of the abutting brake pad and mount surfaces.

In order to prevent undesired rotation and/or vibration of the brake pad within its mounting (for example, rotation about the brake application direction), the brake pad backing plate and the adjacent mounting bracket horns supporting the brake pads in the circumferential direction required a relatively tall radial height to minimize the amount of brake pad rotation before a corner of the backing plate contacted the adjacent mount horn (a motion referred to as "pad kick" or "pad turnout," caused by "twisting" or "tipping" of the pad in the caliper as the rotating brake disc attempts to raise one end of the brake pad while pushing down on the other end of the brake pad). This relatively tall structure in turn would require the brake caliper, which is installed over the brake pads and mounting bracket, to have its corresponding opposing inner surfaces radially outboard of the mount horns be relieved enough to accommodate the outer corners of the brake pad and/or mount horns. This thinning again may cause stress level and fatigue life problems. Because the maximum outer radius of the brake caliper is typically constrained by very tight clearance to the inside of the adjacent wheel rim, the brake caliper arms straddling the brake disc between the application side and the reaction side of the caliper may have to be made thinner than desired in order to accommodate both the tall carrier mount horn and the close-fitting wheel rim. This can lead to very high tensile and bending stresses in the thin regions and thus reduction in fatigue life and service life.

One approach to addressing such problems is disclosed in U.S. patent application Ser. No. 13/673,404, the teachings of which are incorporated by reference herein. This patent application discloses brake pads with features to receive spring elements at the pads' lateral and/or lower (i.e., radially inner) sides. The spring elements are configured to cooperate with corresponding features on the brake pad holder to retain the brake pad within the brake during operation, with or without other brake pad retaining features and/or additional brake pad retention devices.

The present invention improves on the spring element approach to brake pad mounting and retention with minimum pad kick motion and pad vibration. In one embodiment of the present invention a spring element configured to engage a lateral and/or lower surface of a brake pad includes a feature such as a protruding "bump" or coiled portion that is shaped to engage within a corresponding spring retaining element such as a bushing in the brake pad carrier. The spring retaining element is configured to resist extraction of the spring element from the retaining element in a radially-outward direction during normal brake operation, and hence resist extraction of the brake pad which is engaged by the spring element in the same direction. The use of a spring retaining element, preferably a replaceable spring retaining element, further improves durability and longevity of the brake pad carrier by isolating the carrier itself from wear caused by brake pad and spring clip motions, as well as removing a stress-concentrating sharp corner where the carrier's horn and bottom surfaces meet.

The spring retaining element may be in the form of a generally cylindrical bushing that is located in a corresponding axial slot in the brake pad carrier, where "axial" refers to the axial direction defined by the rotation axis of the brake's brake disc when the brake is in an installed position on a vehicle axle. The bushing may have an axially-aligned slot which is wide enough to permit a thin section of the spring element to be located between the brake pad and the interior region of the bushing, but narrow enough to preclude removal of a thicker section of the spring element in the radially outward direction (for example the spring element may have a coiled end sized to permit its insertion in the axial direction into the interior region of the bushing). The spring retaining element may be configured to receive the thicker portion of the spring element in the axial and/or radial directions, such as with a brake pad and spring element inserted into the brake pad carrier in either the radially-inward direction or in the axial direction (i.e., toward or away from the brake disc).

The invention is not limited to cylindrical spring element retention arrangements, but may be any shape that provides for positive retention in the radially outward direction of the spring element and brake pad in the brake pad carrier, for example a spring retaining element or corresponding brake pad carrier receiving feature may have a rectangular cross-section.

Similarly, the invention is not limited to arrangements in which the spring element must be inserted into the spring retaining element in an axial manner. For example the portion of the spring element that enters the interior region of the spring retaining element may be configured to expand after passing laterally through a bushing's axial slot as the assembled brake pad and spring element is inserted in the radially-inward direction, such that the spring element is "snapped" into place in the spring retaining element as the brake pad reaches its installed position. Further, a combination of installation motions may be used, such as insertion of the spring element into the spring retaining element, followed by inserting the brake pad radially-inward into the brake pad carrier to align the brake pad with the spring element and then moving the brake pad axially toward the brake disk until the brake pad engages the spring element.

The invention also is not limited to arrangements in which the spring retaining element is located at a lower corner of the brake pad carrier, i.e., at the junction of the carrier's side and bottom walls, but may be located on the side and/or bottom walls as long as the spring element and brake pad are positively retained in the radially outward direction during normal brake operations.

The spring element may also have side extensions, such as tabs, which conform to the width of the brake pad carrier and serve to both align and guide the brake pad into position during installation and lock the spring element into place against lateral motion toward or away from the brake disc as the brake pad is advanced or withdrawn from the brake disc.

The present invention may be used with or without other radially-outer brake pad retaining devices being present over the brake pads.

With this present invention, during in-service brake operations the brake pad is retained in the brake in a simple and positive manner by the combination of: (i) the spring element being retained by spring retaining element that is fixed on the brake pad carrier, and (ii) brake pad being retained by the spring element, for example by engagement of a spring element protrusion into one or more features (such as a notch) in a lateral side of the brake pad. The spring element protrusion which engages the side of the brake pad is preferably formed in a wedge-shape which resists "camming out" of the brake pad slot during the brake application. Spring elements may be provided on one or both lateral sides of the brake pad.

Other objects, advantages and novel features of the present invention will become apparent from the following detailed description of the invention when considered in conjunction with the accompanying drawings.

DETAILED DESCRIPTION OF THE DRAWINGS

Figure 1:
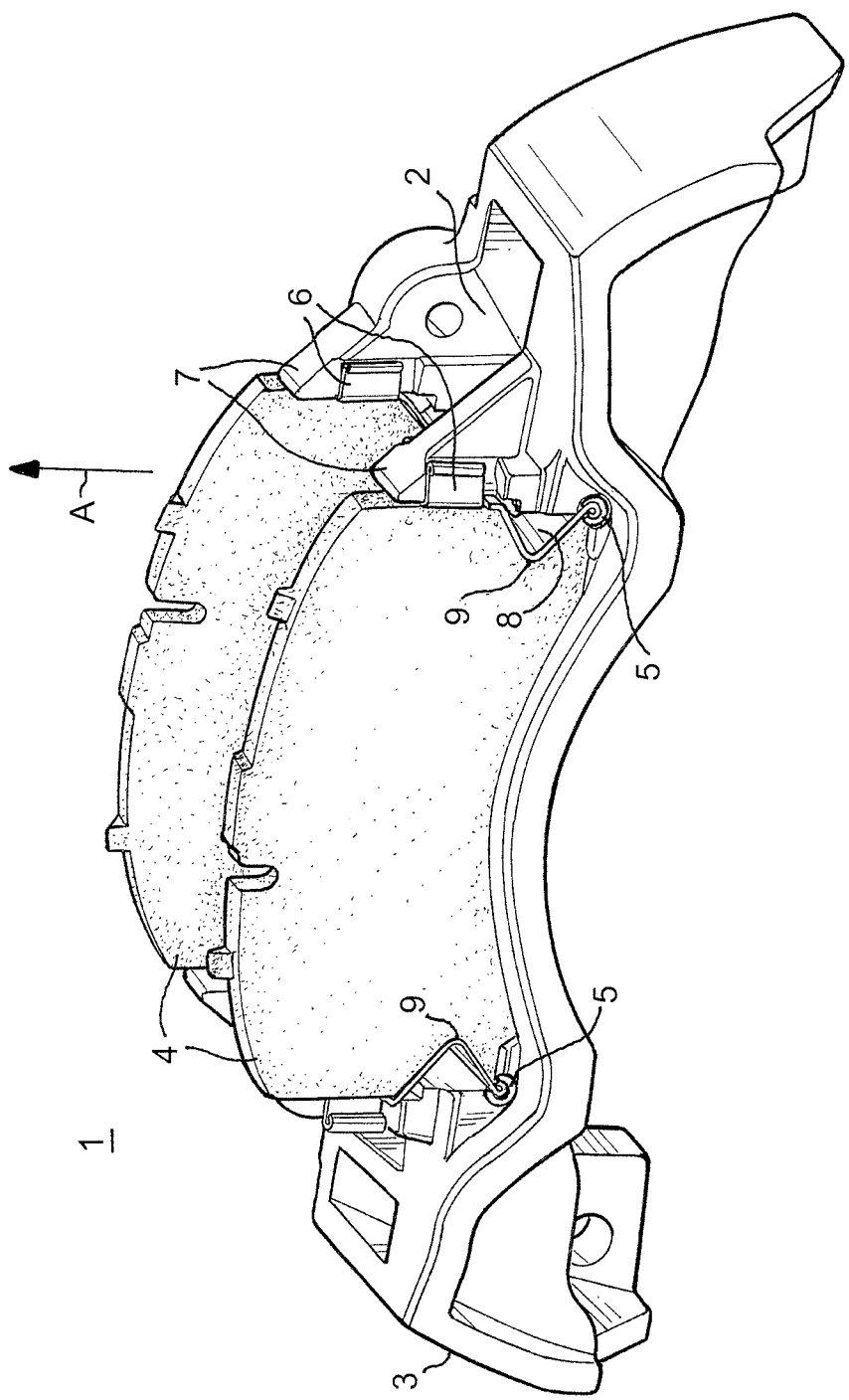
FIG. 1 is an oblique view of an embodiment of a brake pad carrier and brake pad retention arrangement in accordance with the present invention.

FIG. 1 shows an embodiment of a brake pad retention arrangement 1 of a disc brake of a commercial vehicle, where the brake disc and brake caliper have been omitted for clarity of illustration. One of ordinary skill in the art will recognize that the brake disc rotates in the central region 2 of the carrier 3 between the brake pads 4 (for clarity only the brake pad backing plates of the brake pad 4 are shown, with the brake pad lining material being omitted). The carrier 3 in this embodiment receives the brake caliper (not illustrated) and the brake pads 4, and thus may be referred to as a carrier mount or a brake pad carrier (hereinafter referred to as brake pad carrier 3). The present invention is not restricted a particular type of brake caliper/mount arrangement (for example, a fixed carrier and a sliding caliper with a single-side brake pad application mechanism, or a fixed carrier and fixed caliper with two-sided brake pad application mechanisms). It also will be appreciated that the carrier need not be a caliper-supporting carrier, i.e., the caliper may be mounted on a component separate from the mount, with only the brake pads being carried by the carrier.

Located on the brake pad carrier 3 are spring retaining elements, specifically bushings 5, located at the bottom corners of the brake pad receiving portion of the carrier. The bushings 5 receive spring elements, specifically spring clips 6, located at lateral sides of the brake pads 4, between the brake pads and the carrier's brake pad abutment horns 7. In addition to cooperating with the bushings 5, the spring clips 6 have portions 8 that cooperate with corresponding notches 9 in the lateral sides of the brake pad 4 to retain the brake pads within the bake pad carrier 3 against motion in the radially-outward direction indicated by arrow A.

Figure 2:
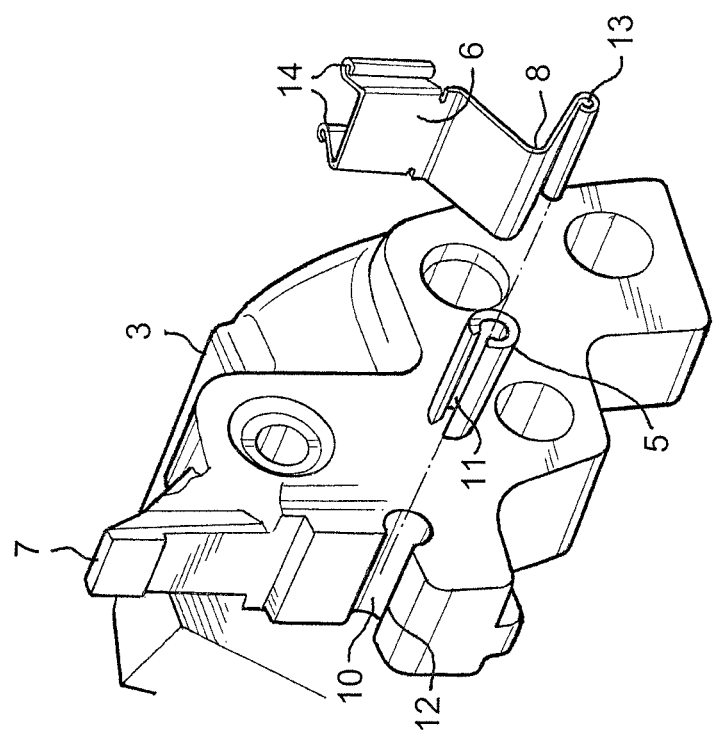
FIG. 2 is an oblique exploded view of a portion of the FIG. 1 brake pad retention arrangement.

The FIG. 2 exploded view shows details of one portion of the FIG. 1 embodiment. The bushing 5 in this embodiment is a cylindrical element sized to be fixedly retained in a corresponding bushing receiving feature 10 in the brake pad carrier 3. The bushing 5 includes an axial slot 11 that is aligned with the aperture 12 formed between the bushing receiving feature 10 and the brake pad receiving region of the carrier. The width of the slot in this embodiment corresponds to a thickness of the plate material of the spring clip 6, such that the spring clip may be received in the bushing 5. A coiled retaining portion 13 of the spring clip 6 is formed such that the retaining portion 13 may be received in the inner region of the bushing 5 such that the spring clip is restrained against movement in the radially-outward direction. The spring clip 6 in this embodiment also has horn-straddling tabs 14 that are configured to straddle the sides of its horn 7 to axially fix the spring clip against axial movement, i.e., against movement parallel to the rotational axis of the brake disc.

Preferably, the bushing 5 is fixed in the carrier 3 by an interference fit. An advantage of this arrangement is that the bushing 5 provides a "buffer" to inhibit corrosion between the clip 6 and the carrier 3, facilitating pad change. The material of the bushing 5 may be the same material of the clip, but that is not required. For example, the bushing 5 may be brass, a softer material than a spring steel clip, because the bushing 4 does not have to provide the spring function provided by the clip 6. Alternatively, the bushing 5 may be a nylon bushing or other corrosion-resistant material to further minimize potential corrosion between carrier 3 and clip 6 and facilitate ease in changing pads. The bushing 5 may be a wear item, however, if wear is low between brake pad changes the bushing 5 may be reused with new brake pads.

The bushing 5 also has the advantage of spreading the loads transferred from clip 6 into carrier over a larger surface area, as well as allowing use of a larger corner radius in the carrier 3 to minimize stress concentration points (e.g., no 90 degree angle stress risers). The bushing 5 may also suppress transfer of wear- and noise-inducing vibrations from the clip 6 to the brake pad carrier 3.

Figure 3:
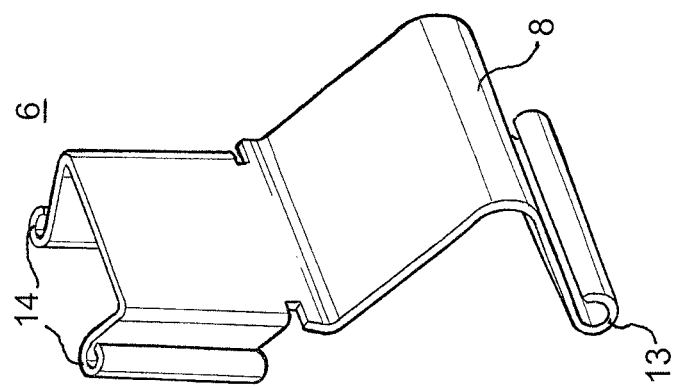
FIG. 3 is an oblique view of the spring element of FIGS. 1 and 2.

The spring clip 6 is shown in greater detail in FIG. 3. In this embodiment the spring clip is formed from a single piece of material, preferably stainless steel in order to minimize corrosion in the harsh operating environment of a disc brake. The spring clip may be formed using conventional stamping and bending techniques to minimize costs. The retaining portion 13 that is formed to fit within the interior region of the bushing 5 is formed by bending of the end of the spring clip back upon itself, while the horn-straddling tabs 14 are formed by bending lateral extensions of the spring clip. For convenience of the technician installing or removing the spring clips 6, the ends of the tabs 14 may, as in this embodiment, be rolled to facilitate passing the tabs onto the horn 7 and/or prying of the spring clip away from the horn during clip removal. The wedge-shaped portion 8 that is configured to cooperate with the corresponding notch 9 in the brake pad may also be formed by bending. The spring clip may be completely formed in one stamping operation, or may be formed in multiple metal-forming operation, with or without use of stamping techniques.

Figure 4:
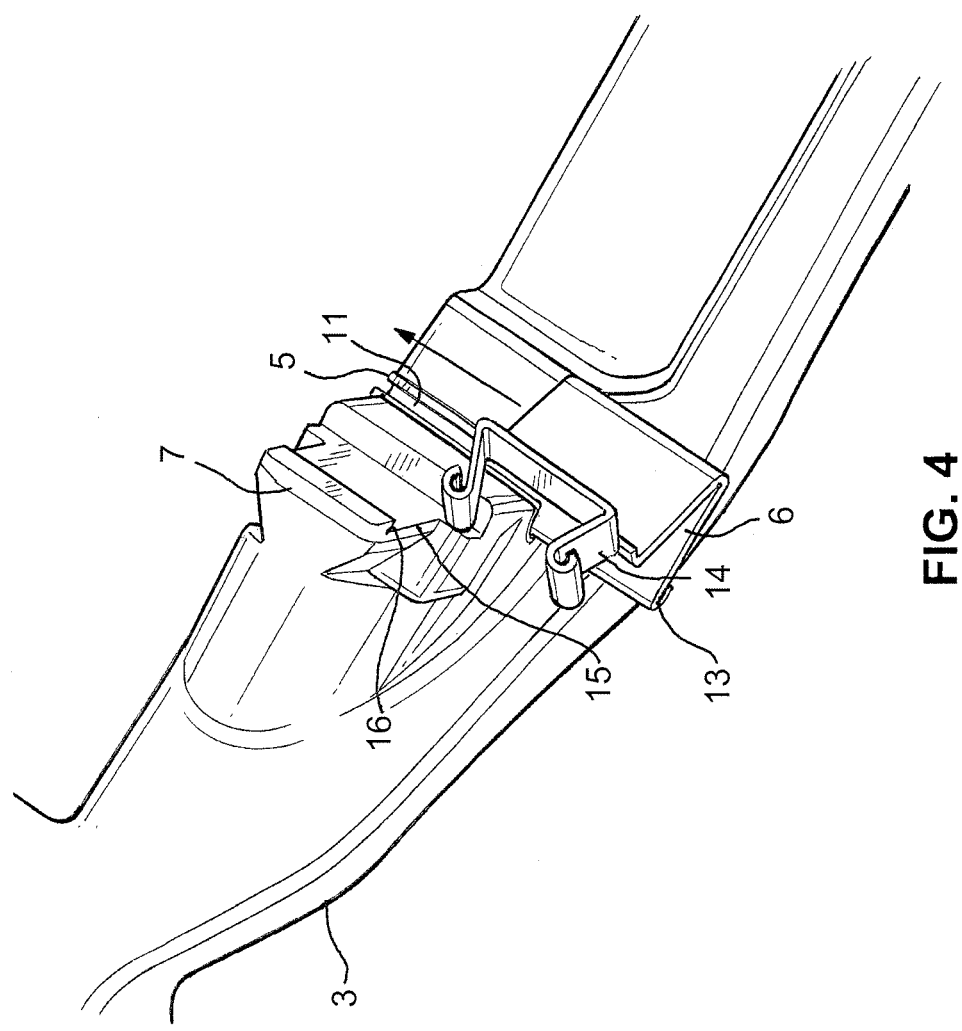
FIG. 4 is an oblique view of the spring element of FIG. 1 during an installation act in accordance with an embodiment of the present invention.

The spring clip 6 and brake pad 4 may be placed into their respective installed positions by various methods, one of which will be explained with reference to FIGS. 1 and 4-7B. FIG. 4 illustrates the insertion of the spring clip retaining portion 13 in the axial direction into the bushing 5, with a flat portion of the clip passing through the bushing axial slot 11. The spring clip 6 in this phase of the installation is tilted inward toward the opposing brake pad abutment horn in order for the nearest horn-straddling tabs 14 to pass the face 15 of the horn 7 facing the brake. Also shown in this figure is a recessed region of face 15 having an upper edge 16 (also visible in FIG. 5). This recessed region has a depth corresponding to the thickness of the upper portion of the plate material of the spring clip 6. The depth need not exactly match the thickness of the spring clip material, as long as it is deep enough to allow the upper edge 16 to provide additional resistance to radially-outward movement of the spring clip 6. In other embodiments, the recessed region may be omitted altogether, simplifying machining of the face 15 of the horn 7.

Figure 5:
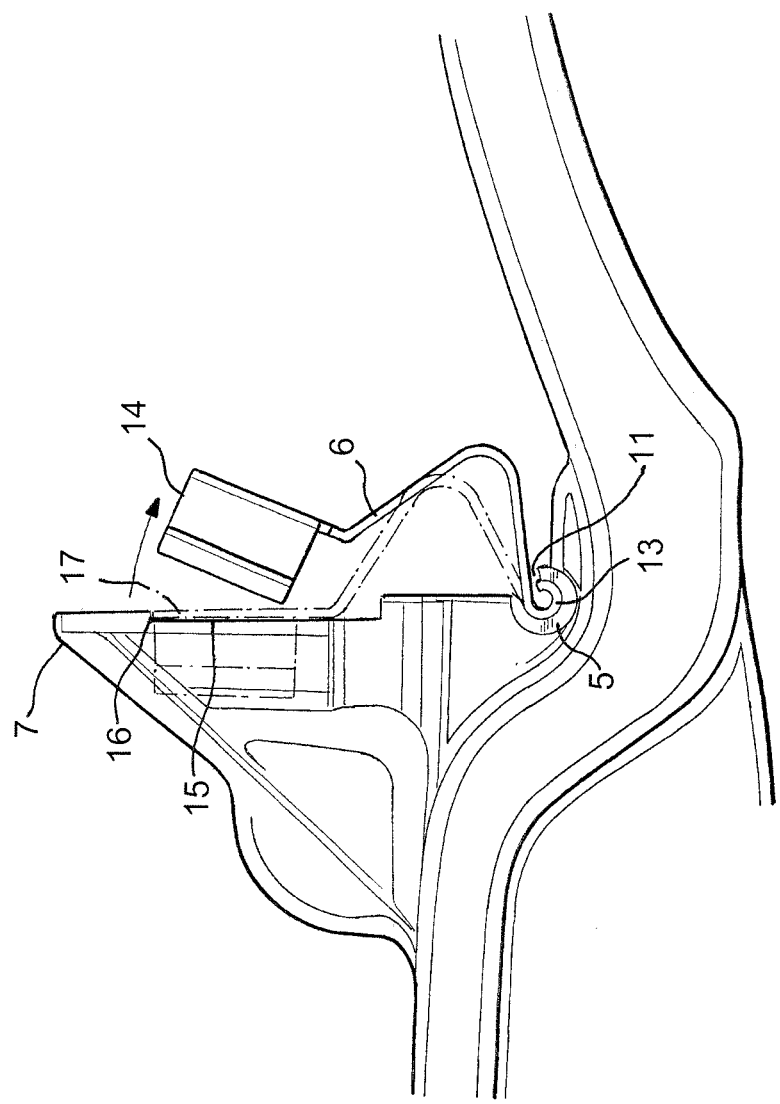
FIG. 5 is an elevation view of another FIG. 1 spring element installation act in accordance with an embodiment of the present invention.
Figure 6:
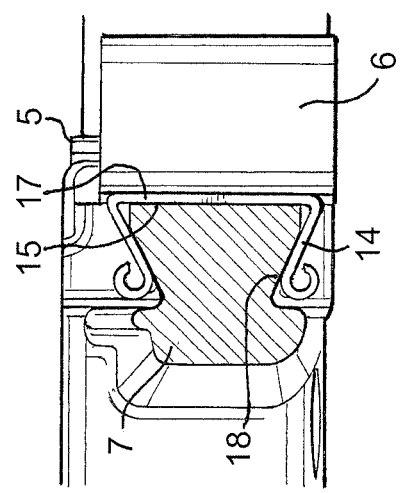
FIG. 6 is a cross-section plan view of the FIG. 1 spring element in an installed position in accordance with an embodiment of the present invention.

FIG. 5 shows two positions of the spring clip 6 following completion of its axial movement into the bushing 5. The first position is the still-tilted position following spring clip insertion into the bushing 5 (the right-most of the two positions). The left-most position show in the spring clip installed position, following rotation of the spring clip 6 into its installed position with its upper portion 17 abutting horn face 15 and being captured below the horn face upper edge 16. For clarity, the horn-straddling tabs 14 are omitted from the second position in FIG. 5; they may be seen in the installed position, however, in the FIG. 6 cross-section taken below horn upper edge 16. The tabs 14 in this embodiment are also bent inward toward one another to firmly bias the spring clip 6 against the horn side faces 18 and horn face 15.

Figure 7B:
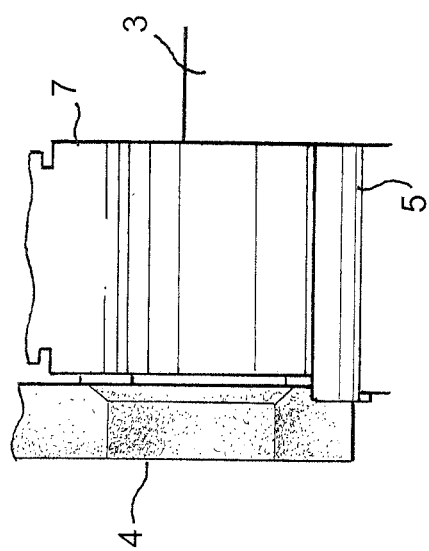
FIGS. 7A and 7B are oblique and elevation cross-section views, respectively, of the relationship between FIG. 1 spring element and a brake pad during a further installation act in accordance with an embodiment of the present invention.
Figure 7A:
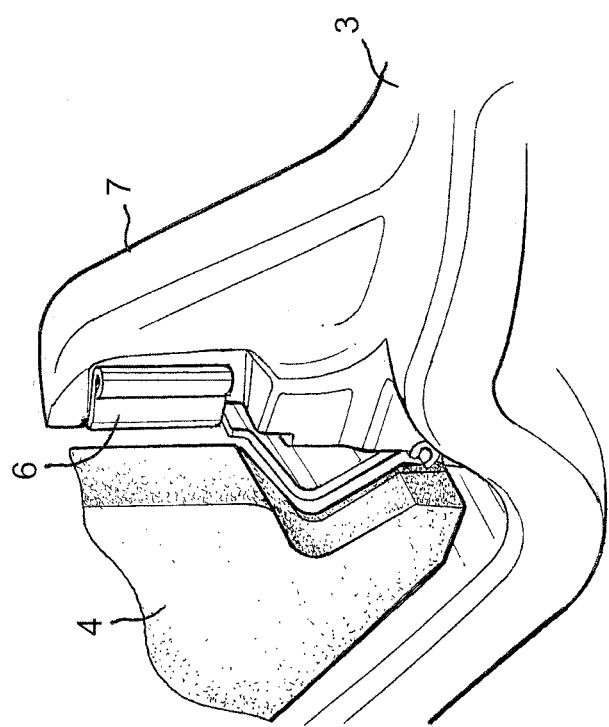

While the present invention is not limited to this embodiment's assembly order, in this embodiment after installation of the spring clip into its installed position the brake pad 4 may be installed onto the brake pad carrier 3. In this embodiment the brake pad 4 is moved to a position at bottom region of the brake pad carrier 3 where the brake pad is aligned with the spring clip 6, as shown in FIGS. 7A and 7B. Preferably the brake pad 4 is inserted in the radially-inward direction, generally parallel to the abutment horns 7 until the brake pad 4 reaches the bottom region of the carrier 3. Preferably the brake pad 4's radially-inward motion includes passage of the brake pad into the brake pad carrier 3 through an opening of the brake caliper (not illustrated), thereby eliminating the need to remove the caliper to install the brake pads.

Once axially aligned with the spring clips 6, the brake pad 4 may be advanced toward the brake disc (not illustrated) into its installed position, engaging the spring clips 6 as shown in FIG. 1. In its installed position, the brake pad is positively retained by the wedge-shaped portion 8 of the spring clip, which in turn is retained by bushing 5 and upper edge 16 on the abutment horn 7.

As noted above, the present invention is not limited to a particular assembly order. For example, if the bushing 5 and spring clip retaining portion 13 are configured, the spring clip 6 may be first installed on the brake pad 4 and the brake pad/clip sub-assembly then inserted directly into the carrier 3 until the retaining portion 13 snaps through bushing axial slot 11 into the interior region of the bushing 5.

Figure 8:
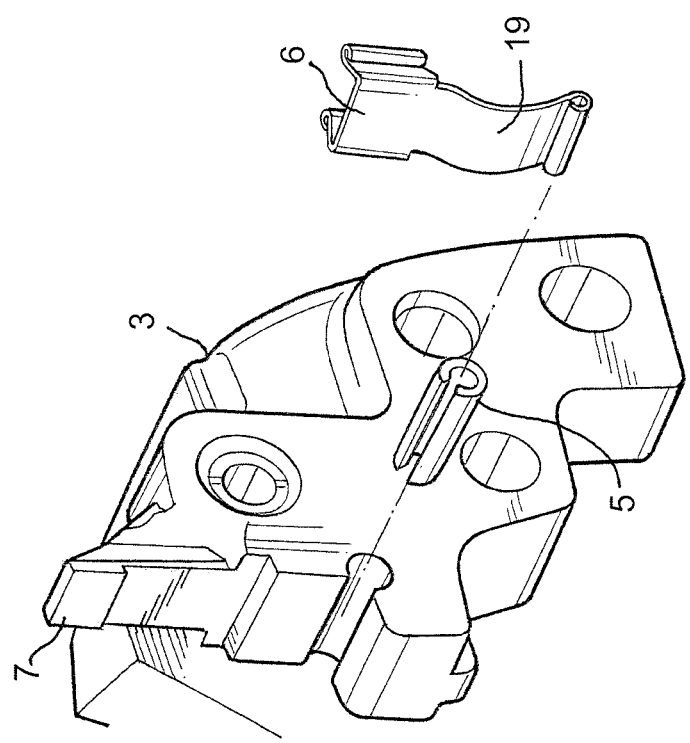
FIG. 8 is an oblique exploded view of a second embodiment of a brake pad retention arrangement in accordance with the present invention.

FIG. 8 shows a second embodiment of the present invention in which the spring clip 6 includes a generally curved region 19 instead of the first embodiment's wedge shaped protrusion. This arrangement provides a broader contact surface between the spring clip 6 and the lateral edge of the brake pad 4 to lower contact stress levels and further assist in suppression of brake pad vibrations during brake application.

Figure 9:
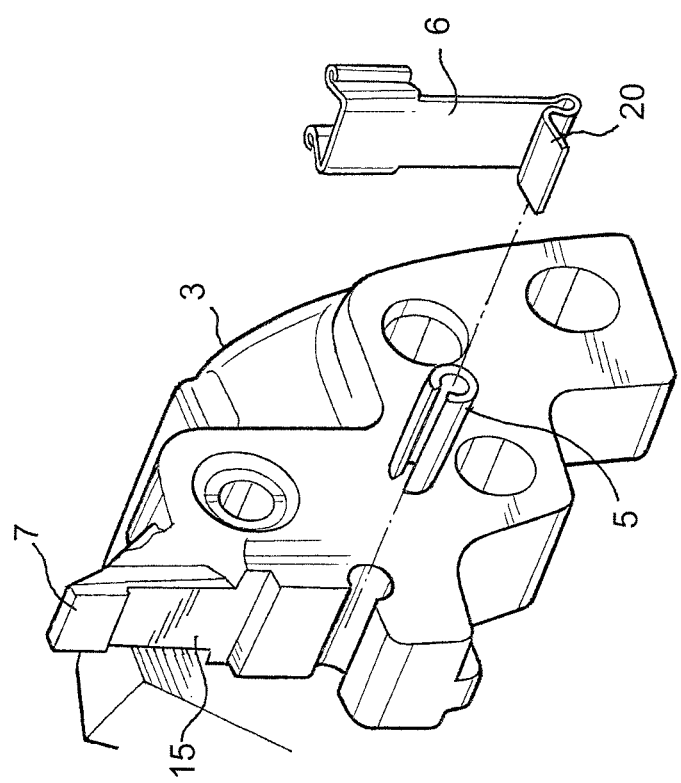
FIG. 9 is an oblique exploded view of a third embodiment of a brake pad retention arrangement in accordance with the present invention.
Figure 10:
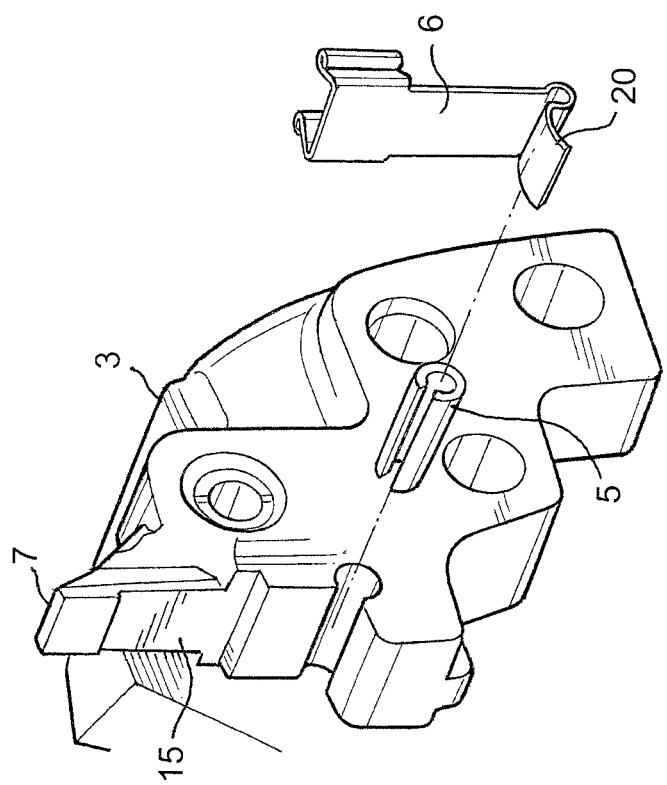
FIG. 10 is an oblique exploded view of a fourth embodiment of a brake pad retention arrangement in accordance with the present invention.

FIG. 9 shows a third embodiment of the present invention in which the portion of spring clip 6 abutting horn face 15 is essentially planar, and further includes a platform portion 20 that extends toward the opposite abutment horn 7 and is positioned beneath (i.e., on a radially-inner side) of the brake pad 4. The laterally-projecting platform portion 20 biases the brake pad 4 in the radially-outward direction against a radially-outer brake pad retaining device over the brake pad (not illustrated) to further assist in suppressing vibrations during brake application. The fourth embodiment shown in FIG. 10 is similar to the FIG. 9 third embodiment, except that its platform portion 20 is arched to increase biasing force and further suppress vibrations.

The foregoing disclosure has been set forth merely to illustrate the invention and is not intended to be limiting. Because other such modifications of the disclosed embodiments incorporating the spirit and substance of the invention may occur to persons skilled in the art, the invention should be construed to include everything within the scope of the appended claims and equivalents thereof.

LIST OF REFERENCE LABELS

1 disc brake pad retention arrangement
2 brake pad carrier central region
3 brake pad carrier
4 brake pad
5 bushing
6 spring clip
7 brake pad carrier brake pad abutment horn
8 wedge-shaped portion, brake pad interface
9 brake pad lateral side notch
10 brake pad carrier bushing receiving feature
11 bushing axial slot
12 brake pad carrier bushing access aperture
13 spring clip retaining portion
14 spring clip horn-straddling tab
15 brake pad abutment horn pad-side face
16 brake pad abutment horn face upper edge
17 spring clip upper portion
18 brake pad abutment horn side face
19 spring clip curved region
20 spring clip laterally-projecting platform portion

What is claimed is:

1. A brake pad retention system, comprising:
a brake pad;
a spring element; and
a spring retaining element,
wherein
the spring retaining element is configured to be held on a brake pad carrier,
the spring element is configured to cooperate with the spring retaining element to resist radially outward motion of the spring element,
the brake pad includes a retention feature configured to cooperate with a corresponding retention feature of the spring element to resist radially outward motion of the brake pad, and
when the brake pad is in an installed position in the brake pad carrier, the spring element is positioned between a lateral side of the brake pad and a face of a brake pad abutment portion of the brake pad carrier,
wherein the spring element is a spring clip, and the spring retaining element is a bushing configured to receive a retaining portion of the spring clip.

2. The brake pad retention system of claim 1, wherein the spring clip includes tab portions extending from the spring clip and configured to straddle the brake pad abutment portion of the brake pad carrier to resist axial motion of the spring clip when the spring clip is in a spring clip installed position.

3. The brake pad retention system of claim 2, wherein the retention feature of the brake pad is one of a concave surface and a convex surface configured to cooperate with a complementary convex or concave portion of the spring clip to resist radially-outward motion of the brake pad when the brake pad is in the installed position.

4. The brake pad retention system of claim 3, wherein the spring clip is configured to be inserted into the bushing into a position in which the tab portions align with the brake pad abutment portion of the brake pad carrier prior to movement to the installed position.

5. The brake pad retention system of claim 1, wherein the bushing is formed from at least one of brass, steel and plastic.

6. A brake pad retention system, comprising:
a brake pad;
a brake pad carrier;
a spring element; and
a spring retaining element,
wherein
the spring retaining element is configured to be held on the brake pad carrier,
the spring element is configured to cooperate with the spring retaining element to resist radially outward motion of the spring element,
the brake pad includes a retention feature configured to cooperate with a corresponding retention feature of the spring element to resist radially outward motion of the brake pad, and
when the brake pad is in an installed position in the brake pad carrier, the spring element is positioned between a lateral side of the brake pad and a face of a brake pad abutment portion of the brake pad carrier,
wherein the spring element is a spring clip, and the spring retaining element is a bushing configured to receive a retaining portion of the spring clip.

7. The brake pad retention system of claim 6, wherein the brake pad carrier includes a bushing receiving feature configured to receive the bushing adjacent to a portion of the brake pad carrier in which the brake pad is located when the brake pad is in the brake pad installed position, and
the bushing receiving feature includes a gap configured to permit the spring clip to extend from the bushing into the portion of the brake pad carrier in which the brake pad is located when the brake pad is in the brake pad installed position.

8. The brake pad retention system of claim 7, wherein the spring clip includes features configured to cooperate with the brake pad abutment portion of the brake pad carrier tab portions extending from the spring clip and configured to straddle the brake pad abutment portion of the brake pad carrier to resist axial motion of the spring clip when the spring clip is in a spring clip installed position.

9. The brake pad retention system of claim 7 wherein the retention feature of the brake pad is one of a concave surface and a convex surface configured to cooperate with a complementary convex or concave portion of the spring clip to resist radially-outward motion of the brake pad when the brake pad is in the installed position.

10. The brake pad retention system of claim 9, wherein the brake pad abutment portion includes a brake pad carrier projection arranged to resist radially-outward motion of an upper end portion of the spring clip.

11. The brake pad retention system of claim 10, wherein the spring clip is configured to be inserted into the bushing in a position in which the features align with the brake pad abutment portion of the brake pad carrier prior to movement to the installed position.

12. The brake pad retention system of claim 6, wherein the bushing is formed from at least one of brass, steel and plastic.

13. A method of installing a brake pad, comprising the acts of:
 installing a spring element into a spring retaining element held on a brake pad carrier;
 aligning a brake pad with the spring element; and
 advancing the brake pad into engagement with the spring element into an installed position of the brake pad on the brake pad carrier,
 wherein
  the spring element cooperates with the spring retaining element to resist radially outward motion of the spring element,
  a brake pad retention feature cooperates with a corresponding retention feature of the spring element to resist radially outward motion of the brake pad, and
  when the brake pad is in an installed position in the brake pad carrier, the spring element is positioned between a lateral side of the brake pad and a face of a brake pad abutment portion of the brake pad carrier,
  wherein the spring element is a spring clip, and the spring retaining element is a bushing configured to receive a retaining portion of the spring clip.

14. The method of installing a brake pad of claim 13, wherein
 the act of aligning the brake pad with the spring element includes moving the brake pad in a radially-inward direction parallel to a plane containing the brake pad when the brake pad is in the installed position until the brake pad retention feature and the spring element retention feature are aligned such that the brake pad is positioned to engage the spring element in the brake pad advancing act.

15. The method of installing a brake pad of claim 13, wherein
 the bushing into which the spring clip is installed during the installing act is located in a bushing receiving feature of the brake pad carrier,
 the bushing receiving feature is adjacent to a portion of the brake pad carrier in which the brake pad is located when the brake pad is in the brake pad installed position, and
 the bushing receiving feature includes a gap configured to permit the spring clip to extend from the bushing into the portion of the brake pad carrier in which the brake pad is located when in the brake pad installed position.

16. The method of installing a brake pad of claim 15, wherein
 the spring clip includes tab portions extending from the spring clip and configured to straddle the brake pad abutment portion of the brake pad carrier to resist axial motion of the spring clip when the spring clip is in a spring clip installed position.

17. The method of installing a brake pad of claim 15, wherein
 in the installing act the spring clip is inserted into the bushing at an angle until the tab portions align with the brake pad abutment portion of the brake pad carrier prior to movement to the installed position, and then the spring clip is rotated to the spring clip installed position with the tab portions straddling the brake pad abutment portion of the brake pad carrier.

* * * * *